Patented Mar. 1, 1932

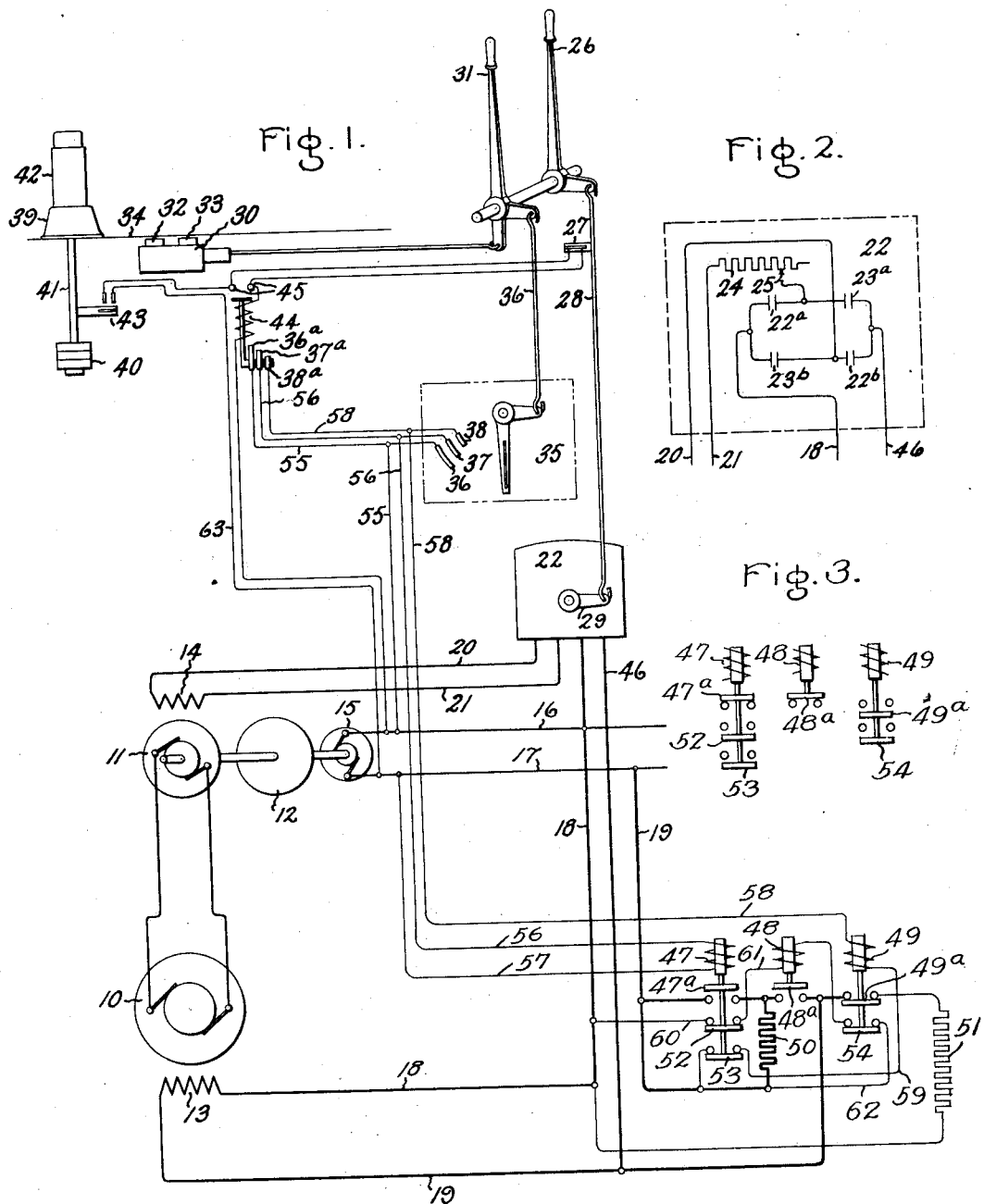

1,847,883

UNITED STATES PATENT OFFICE

BRUNO MATTHIE, OF BERLIN-HALENSEE, GERMANY, ASSIGNOR TO GENERAL ELECTRIC COMPANY, A CORPORATION OF NEW YORK

SYSTEM OF MOTOR CONTROL

Application filed January 18, 1930, Serial No. 421,846, and in Germany April 15, 1929.

This invention relates to variable voltage control systems; more particularly to systems in which a variable voltage generator is connected to supply current to a motor and has for an object the provision of means for minimizing the occurrence of electrical braking between the motor and the generator under certain conditions of operation.

In the operation of hoisting machinery it is desirable to remove the driving force of the motor that hoists the movable load body simultaneously with the application of the emergency brake in order that the brake shoes shall not become overheated and worn. In electrical hoisting machines driven by three-phase asynchronous motors, this may be done by disconnecting the stator from its source of supply. On the other hand, in the case of hoisting machines driven by Ward-Leonard drives it is customary in effecting a stop first to weaken the generator field by connecting resistance in its circuit, and finally to disconnect it from its source of supply.

During the decay of the field of the supply generator the driving motor will operate either as a motor or as a generator depending, of course, upon the relation that exists between the weakening of the generator field and the decrease in speed of the driving motor due to the application of the emergency brake.

In systems in which the movable load body is raised and lowered by means of a cable wound upon a winding drum driven by the driving motor the weakening of the generator field may be permitted to take such a course that the driving motor will act as a generator and drive the generator as a motor in order to take advantage of the additional resulting electric braking and thereby bring the movable load body to rest more rapidly.

However, in traction systems in which the movable load body is raised and lowered by means of a cable wound several times about a traction drive pulley driven by the drive motor, conditions are entirely different. In this case, the rate of retardation of the motion of the movable load body due to the application of the emergency brake is limited by cable slipping conditions. In all cases the rates of retardation are preferably so chosen that even in the most unfavorable condition of operation the cable slipping condition will be entirely avoided. On the other hand, since it is desirable that the braking force of the emergency brake shall be as great as possible in order that its static holding effect will be sufficient to hold the cable when it is supporting its maximum load, it will be clear that any substantial additional electric braking should be avoided in order not to introduce the condition of cable slipping. However, since the rate of retardation of the motor speed will vary with the different operating conditions met in practice such as hoisting and lowering and overhauling loads, it is clear that the time for the decay of the generator field cannot be adjusted to prevent the driving motor from operating neither as a motor nor as a generator under all conditions of operation. It will thus be clear that operating conditions under which the motor will act as a generator are possible and that the additional electric braking which results therefrom when added to the braking effect of the mechanical emergency brake will cause the cable to slip on the traction pulley.

These difficulties are avoided in the present invention by weakening and subsequently disconnecting the field of the driving motor from its source of excitation when the brake is applied, thereby minimizing electrical braking due to the tendency of the driving motor to operate as a generator when the field of the supply generator is weakened. In carrying this invention into effect in one form thereof, I provide a suitable current limiting device together with means responsive to application of the brake for inserting this current limiting device in the field circuit of the motor and subsequently interrupting the field circuit.

In modern Ward-Leonard driven passenger elevator systems, service stops are usually made by electrical braking of the driving motor and only emergency stops are effected by application of a mechanical brake. This invention although especially advantageous in its application to systems in which emergency stops are effected by application of a mechanical brake is, of course, not limited thereto since it is also applicable to systems in which both service stops and emergency stops are effected by mechanical brakes. Accordingly, I have illustrated this invention as embodied in a system in which mechanical brakes are utilized for effecting both service stops and the emergency stops.

For a better and more complete understanding of the invention reference should now be had to the following specification and to the accompanying drawings in which Fig. 1 is a simple diagrammatic representation of an embodiment of the invention; Fig. 2 is a detail of the system; and Fig. 3 is an explanatory diagram illustrating an operating condition of a portion of the system.

Referring now to the drawings a hoisting motor 10 serves to raise and lower a movable load body, such for example as the cage of a hoist or an elevator car. Although not shown in the drawings it will be understood that the armature of the motor 10 will be mechanically connected to the traction sheave about which are wound a few turns of a traction cable, the ends of which are suitably attached and secured to the cage or car and to a counterweight respectively.

The armature of hoisting motor 10 is supplied with electrical energy from a variable voltage generator 11 to which it is connected in Ward-Leonard fashion as shown in the drawing; the generator being driven by any suitable driving means, such for example as the electric motor 12 which is supplied from any suitable source of power (not shown).

The hoisting motor 10 and supply generator 11 are provided with field windings 13 and 14 respectively, which are energized from a suitable source of direct current power, such for example as the direct current exciter 15 which is mounted on the same shaft as generator 11 and is driven by motor 12.

The armature of the exciter 15 is connected to its supply buses 16 and 17, to which the field winding 13 is connected by means of conductors 18 and 19, and to which the field winding 14 is connected by means of conductors 20 and 21 through the contacts of a suitable reversing and speed regulating switch mechanism 22. The regulating switch mechanism as shown in Fig. 2 of the drawing comprises the usual reversing contacts 22a, 22b, 23a and 23b, together with a regulating resistance 24 and a cooperating variable contact 25. The field of the control generator 11 is regulated and reversed by the control switch 22 which is actuated by a control lever 26. This control lever is provided with a contact 27 which is closed when the control lever is in the central or neutral position in which it is shown. The particular form of connection employed between the lever 26 and the reversing and field resistance regulating contacts forms no part of this invention and for this reason the connection has been merely schematically indicated in the drawing by the connecting rod 28 and crank lever 29. Persons skilled in the art will readily supply any desired form of connection between the control lever and the contacts.

The usual service brake 30 is operated by the lever 31. When the brake lever 31 is operated from its central or neutral position it causes the brake shoes 32 and 33 to engage the surface of a brake drum mounted on the shaft of driving motor 10, the braking surface of this drum being represented schematically in the drawings by the line 34.

A contact device 35 is connected to the brake lever 31 by means of a connecting rod 36. Upon application of the service brake the contact is made between the segments 36 and 37 as soon as the stroke of the lever sufficient for stopping the machine is completed. If the brake is tightened still further then the segment 38 will be connected with segment 36.

The shoe 39 of the emergency brake is biased toward braking engagement with the braking surface 34 of the brake drum by means of the weight 40 to which it is attached by the connecting rod 41 but is normally held from engagement therewith by any suitable well-known means.

The movable member of a normally closed contact 43 is attached to the connecting rod 41 and is operated to the open position when the brake shoe is in the brake applied position in which it is shown in the drawing. This contact is located in the energizing circuit of a control relay 44 which, when deenergized, permits its armature member to descend under the attraction of gravity to connect successively the segments 37a and 38a with the contact segment 36a. These contacts are connected with the corresponding contacts 36, 37 and 38 as shown. When the armature of the relay 44 descends to its lowermost position in which it is shown, the auxiliary locking contact 45 is open. Energization of the relay 44 by the closing of the contacts 43 may only be accomplished again when locking contact 27 has been closed to provide a bridge across the normally open locking contact 45. That is to say that the relay 44 once deenergized may only be reenergized when the control lever 26 has been returned to its central or neutral position.

It will be observed that the conductor 19 in the circuit of field winding 13 is also common to the field winding 14 since the reversing switch 22 for field winding 14 is connected to the exciter supply bus 17 through conductors 19 and 46.

This common lead 19 is connected from side 17 of the excitation supply bus to the field 13 of the driving motor and field 14 of the supply generator through a field weakening and disconnecting device which as shown consists of three contactors 47, 48 and 49, a suitable field current limiting device such for example as the resistance 50, and a field discharge resistance 51.

The contactor 47 is provided with a main contact 47a which when operated to its open position serves to insert the resistance 50 in the circuits of field windings 13 of the motor 10 and field winding 10 of generator 11 thereby weakening these fields. Contactor 48, in its open position, serves to interrupt these field circuits. The contactor 49 is provided with a main contact 49a which in its closed position serves to connect the protective field discharge resistance 51 in parallel with the motor field winding 13. When their operating coils are deenergized these contactors descend under the attraction of gravity to the positions in which they are illustrated in Fig. 3 whilst when the operating coils are energized in response to the application of either of the brakes 30 or 39 the contactors are operated to the position in which they are shown in Fig. 1.

In addition to its main contacts 47a, contactor 47 is provided with auxiliary interlocking contacts 52 and 53 which are open when the main contacts are closed and vice versa. Contactor 49 is also provided with an auxiliary interlocking contact 54 which is open when the main contact 49a is open.

With the above understanding of the apparatus and its organization, the operation of the system will be readily understood from the detailed description that follows: Assuming the emergency brake applied to effect an emergency stop as illustrated in Fig. 1 of the drawing, the movable contact member 43 will be disengaged from its cooperating stationary contact thereby interrupting the energizing circuit for control relay 44. When relay 44 becomes deenergized its armature member is permitted to descend due to gravity and as it falls it bridges the contacts 38a and 37a thereby completing an energizing circuit for contactor 47 that extends from the exciter supply bus 16 by way of conductor 55, through contacts 36a and 37a, conductor 56, to and through the coil of contactor 47, and thence by conductor 57 to the opposite exciter supply bus 17. Contactor 47 in responding to the energization of its coil operates its upper main contact 47a to the open position whilst the auxiliary contacts 52 and 53 are operated to the closed position as shown in the drawing. The upper main contact 47a interrupts the short circuit about the field weakening resistance 50, thereby causing it to be inserted in the common conductor 19 in circuit with the field windings 13 and 14 of the driving motor 10 and the control generator 11. As a result of the insertion of the field weakening resistance 50 in the field circuits, the field currents are weakened by an amount that can be adjusted as desired.

As the armature of the relay 44 descends further it bridges the contact segments 36a and 38a to complete the energizing circuit for the contactor 49; the circuit being traced from the positive supply bus 16, by conductor 55 to contact 36a, then through the bridging connection of relay 44 to contact 38a, conductor 58 and coil of contactor 49, conductor 59, interlock 53 in its closed position, and thence by conductor 19 to the opposite supply bus 17. Contactor 49 in responding to the energization of its coil closes its upper main contact 49a as well as its auxiliary contact 54. One terminal of the field discharge resistance 51 is permanently connected to conductor 18 and the closing of the main contact 49a serves to connect the opposite terminal of resistance 51 to the conductor 19 to provide a parallel discharge path for the field windings 13 and 14.

The closing of the auxiliary interlock contact 54, which is timed to follow the closing of the main contact 49a, results in the establishment of an energizing circuit for contactor 48, the circuit being traced from positive supply bus 16 through conductor 18, conductor 60, interlock 52, conductor 61, to and through the coil of contactor 48, interlock contact 54, conductor 62, and thence by conductor 19 to the opposite supply bus 17. Contactor 48 in responding to energization opens its main contacts 48a thereby interrupting the common conductor 19 through which the field windings 13 and 14 are supplied.

The inductive energy stored in the fields of the motor 10 and the generator 11 is rapidly dissipated in the discharge resistor 51. The interruption of the motor field circuit prevents the hoisting motor 10 from operating as a generator and thus effectually prevents an electrical braking action from taking place; the stored energy of the rotating parts being dissipated in the form of heat by the emergency brake.

When the conditions which cause the application of the emergency brake is cleared and the brake shoe 39 again raised from engagement with the brake drum 34, the movable contact member 43 will again engage and bridge its cooperating stationary contacts in the energizing circuit of control relay 44. Control relay 44, however, does not respond immediately since locking contact 45 is still open. In order to energize relay 44 it is necessary to return the control lever 26 to its central or neutral position thereby to close the contact 27 and complete an energizing circuit extending from upper exciter supply bus 16, to and through the coil or relay 44, through auxiliary contacts 27 and 43 in series, thence by conductor 63 to the opposite exciter supply bus 17. Control relay 44 then closes and its locking contact 45 establishes a locking circuit independently of the contact 27 on control lever 26. In responding to energization relay 44 successively disconnects contact segments 38a and 37a from segment 36a, thereby deenergizing contactors 47 and 48 and allowing them to return to their normal positions. Contactor 49 opens first, and contactors 48 and 47 close in the order named. Since contact 27 is open when the control lever 26 is in an operative position it will be seen that the relay 44 and consequently the contactors 47 and 48 cannot be deenergized until the control lever 26 is returned to its central or neutral position. Consequently the energization of the field circuits 13 and 14 and an unintentional start are thereby prevented.

The field weakening and disconnecting contactors 47, 48, and 49 may also be used for weakening and disconnecting the field circuits of the motor 10 and the generator 11 in dependence upon the position of the service brake lever for the purpose of protecting these machines and for the further purpose of saving energy. For this purpose the contact device 35 actuated by the service brake lever is provided. If the service brake lever is applied to such an extent that the brake pressure necessary for stopping the machine is obtained then the contact segment 36 is connected with contact segment 37 and contactor 47 operates as before to weaken the fields 13 and 14 by inserting the resistance 50 in the common supply conductor 19. If the brake lever is applied still further then contact segments 36 and 38 are bridged and contactors 49 and 48 are operated in the manner already described to connect the discharge resistor 51 in parallel with the field windings 13 and 14 and to interrupt their circuits.

Although in accordance with the patent statutes I have described my invention as embodied in specific apparatus, I would have it understood that the apparatus shown in the drawings is merely illustrative and that modifications and alterations will readily occur to persons skilled in the art without departing from the true spirit of the invention or from the scope of the annexed claims.

What I claim as new and desire to secure by Letters Patent of the United States is:

1. In a motor control system for driving hoisting machinery and the like, a generator and a motor supplied therefrom for driving a movable load body, a brake for retarding the speed of said motor, a resistance device, and means responsive to application of said brake for connecting said resistance device in the field circuit of said motor to control the electrical braking action by said motor and generator.

2. In a motor control system for driving hoisting machinery and the like, a generator having a field circuit and a motor supplied from said generator for driving a movable load body, a field circuit for said motor, a source of excitation for said field circuits, a brake for retarding and stopping said motor, a discharge resistance and means responsive to application of said brake for disconnecting said field circuits from said source and for subsequently connecting said discharge resistance to said motor field circuit.

3. In a motor control system for driving hoisting machinery and the like, a generator and a motor supplied therefrom for driving a movable load body, a brake for retarding the motion of said body, a current limiting device, and means responsive to the application of said brake for connecting said current limiting device in the field circuits of said generator and said motor to control the electrical braking action by said motor and generator.

4. In a variable voltage motor control system, a generator provided with a field circuit and means for varying the excitation of said circuit to vary the voltage of said generator, a motor supplied with current at varying voltages from said generator for driving a movable load body, a field circuit for said motor, a brake for retarding the motion of said body, a common supply conductor for said field circuits, a resistance device, and means operable in response to the application of said brake for connecting said resistance device in circuit with said common conductor to limit the electrical braking action by said motor and said generator.

5. In a variable voltage system, a generator provided with a field circuit and means for varying the excitation of said circuit to vary the voltage of said generator, a motor provided with a field circuit and supplied from said generator for driving a movable load body, a brake for retarding the motion of said body, a resistance device, and means responsive to application of said brake for connecting said resistance device in circuit with said field circuits and for subsequently interrupting said field circuits thereby to prevent electrical braking between said motor and said generator.

6. In a variable voltage control system, a variable voltage generator provided with a field circuit, a motor connected to said generator and provided with a field circuit, means for varying the excitation of said generator to vary the voltage supplied to said motor, a resistance connected in said field circuits, normally closed contacts for normally short circuiting said resistance, a braking device for retarding the rotation of said motor, and means responsive to application of said braking device for removing the short circuit about said resistance to reduce the electrical braking action between said motor and said generator and for subsequently interrupting said field circuits to prevent electrical braking between said motor and said generator.

7. In a variable voltage control system, a generator and a motor supplied therefrom for driving a movable load body, respective field circuits for said generator and said motor, means for varying the excitation of the generator field circuit to vary the voltage supplied to said motor, a current limiting device and a discharge resistor associated with said field circuits, a brake for retarding the motion of said load body, and means responsive to application of said brake for connecting said current limiting device in said field circuits to reduce the electrical braking between said motor and said generator and for subsequently interrupting said field circuits and connecting said discharge resistor in parallel therewith.

8. In a variable voltage control system, a generator and a motor supplied therefrom for driving a movable load body, respective field circuits for said generator and motor, means for varying the excitation of the generator field circuit to vary the voltage supplied to the motor, a resistance connected in said field circuits, a normally closed contact for normally short circuiting said resistance, a source of excitation for said field circuits, and a second normally closed contact for connecting said circuits with said source, a brake for retarding the motion of said load body, and means responsive to application of said brake for opening said first mentioned normally closed contact to insert said resistance in said field circuits and for subsequently opening said second normally closed contact to interrupt said field circuit and thereby prevent electrical braking between said motor and said generator.

9. In a variable voltage control for hoisting machinery and the like, a generator and a motor supplied therefrom for hoisting a load body, respective field circuits for said generator, and said motor, a manually operable controller having a neutral position and an operative position, means controlled by said controller in said operative position to control the excitation of said generator and the starting of said motor, a resistance associated with said field circuits, a brake for retarding the motion of said load body, electroresponsive means normally operated to an inoperative position and operable responsively to application of said brake for connecting said resistance in series in said field circuits and subsequently interrupting said field circuits, and an interlock connected to said controller and operable in said operative position of said controller to prevent the return of said electroresponsive means to normal position thereby to prevent an unintended start of said motor.

10. In a variable voltage control system, a generator and a motor supplied therefrom to drive a movable load body, respective field circuits for said generator and said motor and a source of supply therefor, a resistance connected in said field circuits and a normally closed contactor for normally short circuiting said resistance, a second normally closed contactor in circuit between said field circuits and said source, a discharge resistor associated with said field circuits and a normally open contactor in series therewith, a brake for retarding the motion of said load body, means responsive to limited application of said brake for opening said first mentioned contactor to insert said resistance in said field circuits, means jointly responsive to increased application of said brake and the operation of said first mentioned contactor for closing said normally open contactor to connect said discharge resistor in parallel with said field circuits, and means jointly responsive to the opening of said first mentioned normally closed contactor and the closing of said normally open contactor for opening said second normally closed contactor to interrupt said field circuits.

In witness whereof I have hereunto set my hand this 23d day of December, 1929.

BRUNO MATTHIE.